(12) United States Patent  (10) Patent No.: US 11,787,633 B2
Blotnik et al.  (45) Date of Patent: Oct. 17, 2023

(54) VENDING-TOTE AND A METHOD THEREOF

(71) Applicant: GET FABRIC LTD., Tel Aviv (IL)

(72) Inventors: Guy Blotnik, Tel Aviv (IL); Shmuel Ur, Shorashim (IL)

(73) Assignee: GET FABRIC LTD, Tel Aviv (IL)

( * ) Notice: Subject to any disclaimer, the term of this patent is extended or adjusted under 35 U.S.C. 154(b) by 267 days.

(21) Appl. No.: 17/132,259

(22) Filed: Dec. 23, 2020

(65) Prior Publication Data

US 2021/0188551 A1   Jun. 24, 2021

Related U.S. Application Data

(60) Provisional application No. 62/952,657, filed on Dec. 23, 2019.

(51) Int. Cl.
*B65G 1/137* (2006.01)
*B65G 47/88* (2006.01)
*B25J 9/16* (2006.01)
*B65G 1/04* (2006.01)
*B25J 9/10* (2006.01)

(52) U.S. Cl.
CPC ............ *B65G 1/1373* (2013.01); *B25J 9/102* (2013.01); *B25J 9/1669* (2013.01); *B65G 1/0492* (2013.01); *B65G 47/8807* (2013.01)

(58) Field of Classification Search
CPC .................................................. B65F 47/8807
See application file for complete search history.

(56) References Cited

U.S. PATENT DOCUMENTS

| 7,925,376 | B2 * | 4/2011 | Lewis | B65G 1/1376 |
| | | | | 186/3 |
| 9,073,736 | B1 * | 7/2015 | Hussain | B66F 9/063 |
| 9,242,751 | B1 * | 1/2016 | Joplin | B07C 5/3412 |
| 10,315,843 | B2 * | 6/2019 | Magens | B66F 9/10 |
| 10,759,597 | B2 * | 9/2020 | Lindbo | B65G 1/0464 |
| 11,235,930 | B2 * | 2/2022 | Bastian, II | B25J 15/0616 |
| 2016/0236869 | A1 * | 8/2016 | Kimura | B65G 1/1378 |
| 2020/0017302 | A1 * | 1/2020 | Lindbo | C12C 11/006 |
| 2022/0267094 | A1 * | 8/2022 | Fagerland | B65G 1/0478 |

\* cited by examiner

*Primary Examiner* — Mark C Hageman
(74) *Attorney, Agent, or Firm* — MYERS WOLIN, LLC (57) ABSTRACT

A vending-tote adapted to be moved by a lift-robot across a shelving-unit to rendezvous with a second tote carried by a second robot, the vending-tote comprising: a container designed to contain a plurality of items; and a dispensing mechanism integrated within the container, wherein the dispensing mechanism is configured to be activated by the lift-robot, the second robot, or both for dispensing at least one item of the plurality of items into the second tote.

25 Claims, 8 Drawing Sheets

VENDING-TOTE AND A METHOD THEREOF

CROSS-REFERENCE TO RELATED APPLICATION

This application claims priority under 35 U.S.C. § 119(e) from U.S. Provisional Patent Application No. 62/952,657, titled "Vending Machine Like tote", filed on Dec. 23, 2019, which is incorporated in its entirely by reference for all purposes without giving rise to disavowment.

TECHNICAL FIELD

The present disclosed subject matter relates to warehouse robotics. More particularly, the present disclosed subject matter relates to automated storage and retrieval systems.

BACKGROUND

Growing operational complexity, high service requirements of computerized distribution storehouses, and the need for an efficient supply chain pose the need for automated item collection systems. Modern distribution storehouses, such as supermarkets, warehouses used for on-line supply chain, or the like, need to deal with a high volume of products being moved into and out of storage, storage density due to space constraints, and a large inventory of different types of items. The items also differ in sizes; packaging types, e.g. cans corrugated cardboard, sacks; and other physical characteristics, such as weight, density, robustness, or the like.

Warehouse robotics refers to the use of robots to transport materials, perform various tasks, and streamline warehouse processes. In recent years, robotics has gained its place in the supply chain, distribution center, and warehouse management industry. Technological advancements and an increasingly competitive business landscape are forcing modern warehouses to seriously consider the use of robotics. With their ability to increase productivity, accuracy, and operational efficiency warehouse automation of all kinds adds value to warehousing operations by automating the execution of menial, repetitive tasks, thus allowing human workers to focus on more complicated tasks.

BRIEF SUMMARY

According to a first aspect of the present disclosed subject matter, a vending-tote adapted to be moved by a lift-robot across a shelving-unit to rendezvous with a second tote carried by a second robot, the vending-tote comprising: a container designed to contain a plurality of items; and a dispensing mechanism integrated within the container, wherein the dispensing mechanism is configured to be activated by the lift-robot, the second robot, or both for dispensing at least one item of the plurality of items into the second tote.

In some exemplary embodiments, the lift-robot is configured to move the vending-tote to a dispensing position located along a vertical aisle incorporated in the shelving-unit for the rendezvous with the second tote carried by the second robot, wherein the second robot is a floor-robot configured to move across a horizontal plane.

In some exemplary embodiments, the vertical aisle comprises a member adapted to engage with the dispensing mechanism when the vending-tote is in the dispensing position.

In some exemplary embodiments, the dispensing mechanism of the vending-tote comprises a hatch having a tab, wherein the tab is adapted to be captured by the member when the vending-tote is at the dispensing position, and wherein the lift-robot is configured to open and close the hatch by exerting a side force on the tab.

In some exemplary embodiments, the second tote comprises a socket adapted to engage with the dispensing mechanism when the vending-tote is in the dispensing position.

In some exemplary embodiments, the dispensing mechanism comprises a hatch having a protrusion, wherein the socket is adapted to capture the protrusion when the vending-tote is in the dispensing position, thereby allowing the second robot to open and close the hatch by exerting a side force on the protrusion.

In some exemplary embodiments, the lift-robot comprises an actuating-unit adapted to interface with the dispensing mechanism of the vending-tote when the vending-tote is in the dispensing position.

In some exemplary embodiments, the actuating-unit comprises a motor and a transmission, wherein the dispensing mechanism comprises a second-transmission connected to a coil, wherein the transmission and the second-transmission are configured to be interfaced in the dispensing position, and wherein the motor is configured to rotate the coil for activating the dispensing mechanism via the second-transmission in the dispensing position.

In some exemplary embodiments, the actuating-unit comprises a linear translation actuator, wherein the dispensing mechanism comprises a chain having a plurality of dividers adapted to engage in turn with a member, and wherein the linear translation actuator are configured to push the chain with the member for dispensing at least one item when the linear translation actuator and the member are interfaced, wherein the member and the linear translation actuator are configured to be interfaced in the dispensing position.

In some exemplary embodiments, the dispensing mechanism is configured to selectively dispense the at least one item without dispensing a portion of the plurality of items, whereby the dispensing mechanism is configured to divide the plurality of items between the second tote and the container.

According to a second aspect of the present disclosed subject matter, a method of dispensing a measured number of items using the vending-tote of claim 1, the method comprising: dispatching the second robot carrying the second tote to rendezvous with the vending-tote; moving the vending-tote using the lift-robot to a dispensing position; and activating the dispensing mechanism of the vending-tote to dispense the measured number of items to the second tote.

In some exemplary embodiments, the container of the vending-tote comprises items of a first type, wherein the second tote comprised at least one item of a second type before the activating the dispensing mechanism to dispense the measured number of items to the second tote, and wherein the first type is different than the second type, whereby after the activating, the second tote comprising a mixed content of items of different types.

In some exemplary embodiments, the activating the dispensing mechanism is performed by the second robot.

In some exemplary embodiments, the second robot is a floor-robot, wherein after the activating, dispatching the floor-robot to a packaging-terminal; whereby additional items may be picked from or added to the second tote in the packaging-terminal.

In some exemplary embodiments, the method of dispensing a measured number of items further comprises: determining the measured number of items and performing the activating so as to dispense exactly the measured number of items.

In some exemplary embodiments, the moving the vending-tote comprises displacing the vending-tote from a location on the shelving-unit, and wherein after the activating, returning the vending-tote back to the location on the shelving unit.

In some exemplary embodiments, the method of dispensing a measured number of items further comprises: dispatching a third robot carrying a third tote to rendezvous with the vending-tote; and activating the dispensing mechanism of the vending-tote to dispense a second measured number of items to the third tote.

According to a third aspect of the present disclosed subject matter, a method for assembling an order that is comprised by a plurality of items, the method comprising: placing a tote on a floor-robot configured to move between at least one shelving-unit and a packaging-terminal; dispatching the floor-robot carrying the tote to rendezvous with a vending-tote; moving the vending-tote by a lift-robot from a shelving-unit to a dispensing position, wherein the dispensing position is located adjacent a shelving unit, wherein the lift-robot is configured to move across the shelving-unit; activating a dispensing mechanism of the vending-tote to dispense a measured number of one or more items of the order to the tote, wherein the activating is performed automatically without human intervention; returning the vending-tote to the shelving-unit; dispatching the floor-robot carrying the tote to the packaging terminal; adding, manually or automatically, items to the tote to assemble the order; and delivering the order, wherein the delivering the order comprises delivering the tote.

In some exemplary embodiments, the method for assembling an order further comprises: dispatching the floor-robot to rendezvous with a second vending-tote carrying items of a second type, wherein the vending-tote is carrying items of a first type; and activating a dispensing mechanism of the second vending-tote to dispense a second measured number of one or more items of the order to the tote, wherein the activating the dispensing mechanism of the second vending-tote is performed automatically without human intervention.

In some exemplary embodiments, the method for assembling an order further comprises: moving the vending-tote by the lift-robot to a second dispensing position, wherein a second floor-robot carrying a second tote is dispatched to rendezvous with the vending-tote at the second dispensing position, wherein the second tote is participating in an assembly of a second order; and activating the dispensing mechanism of the vending tote to dispense a second measured number of one or more items to the second tote.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

One objective of the present disclosure is to provide automated distribution storehouses with a vending-tote to autonomously dispense a measured number of items to another tote in an automated manner, and potentially without departing from its shelf-unit. In some cases, the vending-tote may be coupled with either a lift-robot or a floor-robot. In some exemplary embodiments, it may be desired that the vending-tote may dispense only a portion of its content, in a selective manner, and retain the remainder portion of the items retained therein.

Another objective of the present disclosure is providing automated distribution storehouses with a system and method adapted for utilizing the vending-totes.

The vending-tote of the present disclosure may obviate the need to dispatch a plurality of floor-robots to bring the totes of each and every item to be manually assembled into another tote at a packaging-area. Instead, a floor-robot carrying a collection-tote, of the present disclosure, may be configured to wander between vending-totes that contain items of a deliverable order and utilize the vending-tote dispensing capability for collecting a required number of items from each such vending-tote, e.g. assembling the order.

In some exemplary embodiments, the vending-tote of the present disclosure may be utilized within a robotic warehouse such as disclosed in U.S. Pat. No. 10,472,172B2, entitled "Robotic inventory handling", filed 8 Jun. 2016, which is hereby incorporated by reference in its entirety for all purposes and without giving rise to disavowment. The vending-tote may be carried by robots of such robotic inventory handling system, including by lift-robots, floor-robots, or the like.

One technical effect of utilizing the disclosed subject matter is reducing the total number of floor-robots trips per each order assembly and reducing the amount of human labor involvement per order. Another technical effect of utilizing the disclosed subject matter is speeding up the process of assembling an order and enhancing the efficiency of robot deployment in automated distribution storehouses.

The disclosed subject matter may provide for one or more technical improvements over any pre-existing technique and any technique that has previously become routine or conventional in the art. Additional technical problems, solutions and effects may be apparent to a person of ordinary skill in the art in view of the present disclosure.

Figure 1:
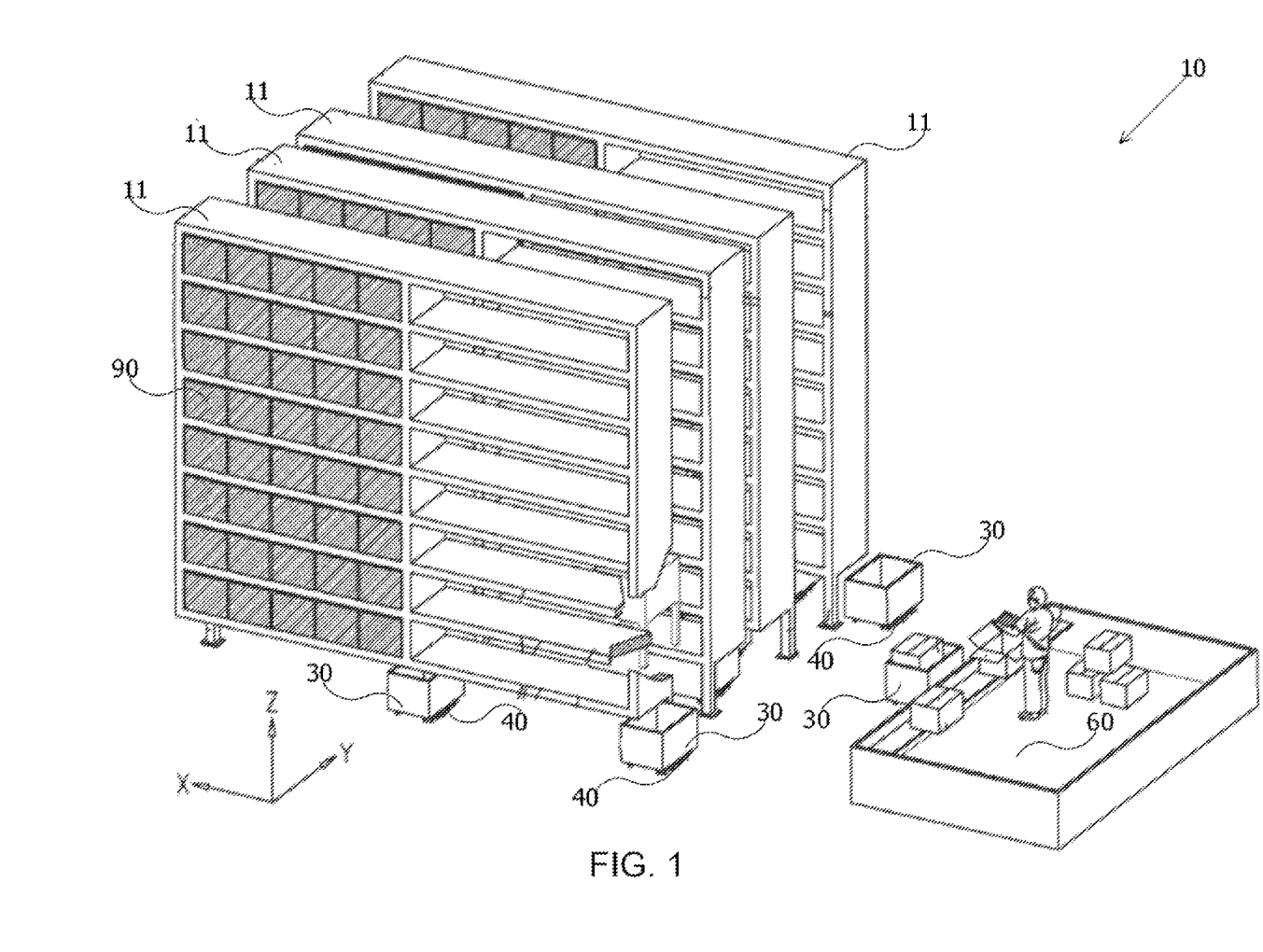
FIG. 1 illustrates an isometric view of an automated distribution storehouse, in accordance with some exemplary embodiments of the disclosed subject matter.

Referring now to FIG. 1 illustrating an isometric view of an automated distribution storehouse, in accordance with some exemplary embodiments of the disclosed subject matter.

Automated distribution storehouse 10 comprises a plurality of shelving-units 11, which are mounted side-by-side, at least one packing terminal 60, and a plurality of floor-robots 40 capable of traveling independently across a horizontal plane, e.g. floor, between the shelving-units 11 and the packaging terminal 60.

In some exemplary embodiments, the shelving-units 11 can be mounted on the storehouse's floor; suspended from the ceiling; ramped-up above the floor; and any combination thereof, or the like. Additionally or alternatively, the plurality of shelving-units 11 or at least a part of them may be mounted on rails that allow each shelving-unit to slide one toward the other in order to allow installing more shelving-units in a given space of the storehouse.

Each shelving-unit 11 can accommodate a plurality of different containers, such as tote 30, and vending-tote 90. It should be noted that it is not mandatory that all the containers will be of identical sizes and shapes. In some exemplary embodiments, a container may hold and retain items of a certain type (e.g., a tote comprising tomatoes). Additionally, or alternatively, a tote may comprise different types of inventory items, optionally items that have an affinity to one another. As one example, and as order that include pasta also tend to include tomato-souse, a single tote may retain both pasta inventory items and its counterpart tomato-souse inventory items.

In some exemplary embodiments, the floor-robots 40 are configured to obtain a container, such as a tote 30, form a lift-robot and independently convey it to terminal 60, or to a different a lift-robot of a different shelving-unit and vice versa. Additionally or alternatively, a floor-robot 40, of the plurality of floor-robots may be configured to travel from one shelving-unit to another for collecting different items into the tote 30 it is carrying.

It should be noted that the plurality of shelving-units 11 are placed high enough above the floor so that floor-robots 40 carrying a container can travel beneath the shelves of the shelving-units in order to deliver containers to their destinations. In some exemplary embodiments, the minimal height of the lowest shelf in shelving-units 11 may be higher than a height of a floor-robot carrying a tote. In some exemplary embodiments, if there are different types of totes with different heights, the height may be a height that is compatible with the highest tote type. Additionally, or alternatively, the height may be a height that is compatible with the highest tote type that is retained in the relevant shelving-unit.

In some exemplary embodiments, items are picked at terminal 60 from containers that arrive, by floor-robots 40, and packed in order totes for delivery to customers. The floor-robots also convey containers to lift-robots for placement back on shelves. In some exemplary embodiments, the packing in terminal 60 may be performed manually, such as by a human picker, by a robotic picker, or the like. In some exemplary embodiments, at terminal 60 different items may be gathered from different inventory totes that are retrieved from storage and brought to terminal 60 by floor-robots. After the inventory tote is utilized and relevant items are picked therefrom, the inventory tote may be returned to shelving-units 11 to be stored therein, in a same location as before or in a different location. In some exemplary embodiments, terminal 60 may be utilized for replenishing inventory totes, such as when new inventory arrives to distribution storehouse 10. In some exemplary embodiments, empty inventory totes may be replenished with new items. Additionally, or alternatively, empty inventory totes may be discarded and replaced by new inventory totes that arrive to the warehouse.

In some exemplary embodiments, a main computer may track the contents of containers, such as totes 30 and totes 90, and their respective location in order to plan and direct the operations of the robots and personnel in distribution storehouse 10.

Figure 2:
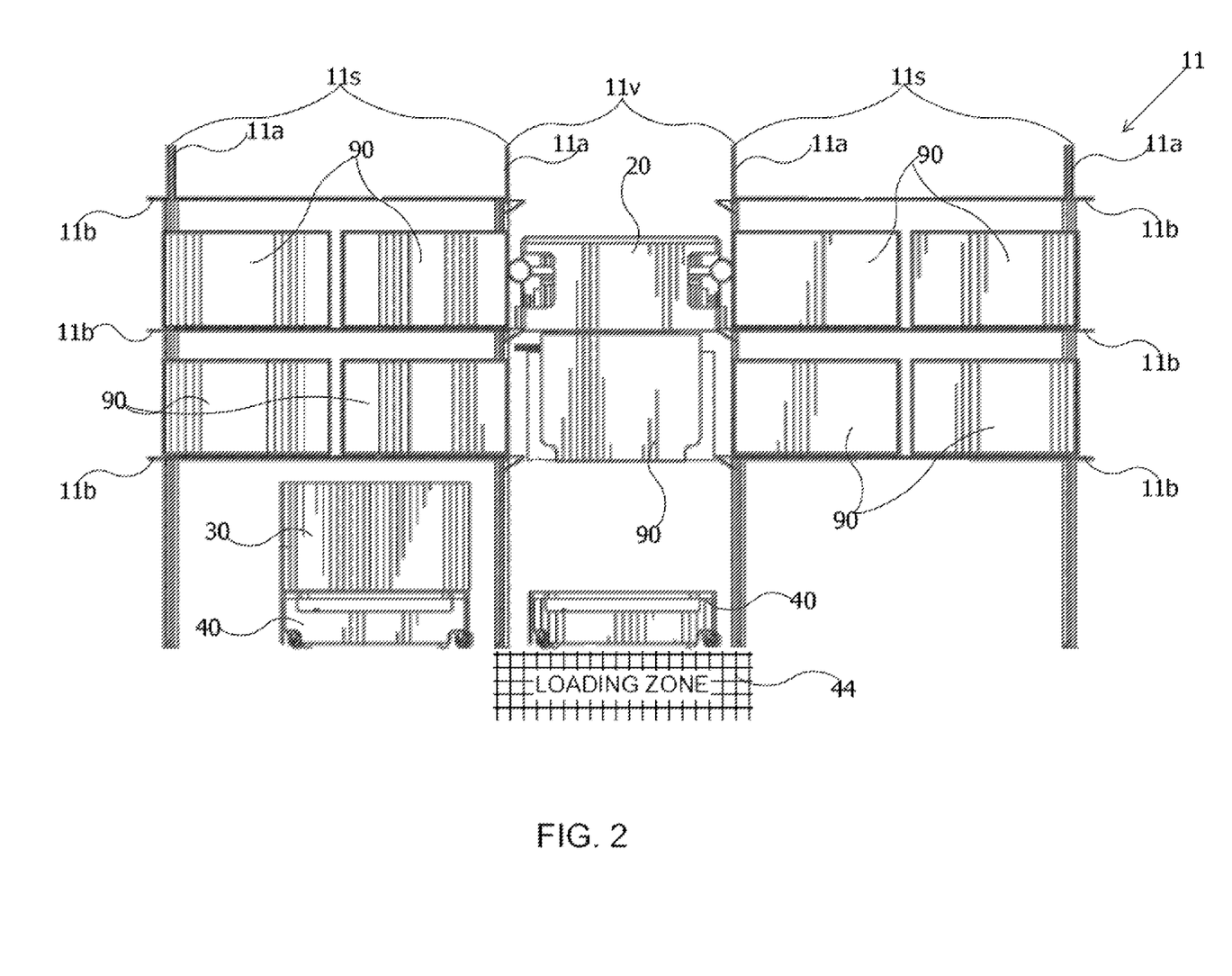
FIG. 2 illustrates a front view of a shelving-unit of the automated distribution storehouse, in accordance with some exemplary embodiments of the disclosed subject matter.

Referring now to FIG. 2 illustrating a front view of a shelving-unit of the automated distribution storehouse, in accordance with some exemplary embodiments of the disclosed subject matter. Shelving-unit 11 comprising at least one section 11s, at least one lift-robot 20, and at least one vertical aisle 11v.

In some exemplary embodiments, the at least one section 11s is comprised of a plurality of shelves 11b that are connected horizontally between posts 11a at intervals one above the other. It should be noted that a plurality of sections 11s can be connected one next to the other for extending the shelving-unit 11 length.

In some exemplary embodiments, each shelf 11b can accommodate a plurality of different containers, such as tote 30, vending-tote 90.

In some exemplary embodiments, at least one vertical-aisle 11v is located in a gap between two sections 11s of the shelving-unit 11 or next to a single section 11s, in case of a one-sided aisle. Vertical aisle 11v can be utilized by a lift-robot 20 for accessing the floor-robot 40. In some exemplary embodiments, an area on the floor under the vertical aisle 11v or substantially in front of it may be reserved as a designated loading zone 44, for allowing the floor-robot 40 to rendezvous with the lift-robot 20.

In some exemplary embodiments, the lift-robot 20 is capable of moving along vertical and horizontal paths situated on the front or back faces of shelving-units 11, so as to reach any given container on the shelving-units 11. Additionally, or alternatively, the lift-robot 20 may be capable of pulling-out any container from its location, e.g. shelf 11b shelving-units 11, and move it to a floor-robot 40, a different shelf 13b, another lift-robot 20, a combination thereof, or the like. In the same manner, the lift-robot 20 can return the container to an empty location on the shelves.

In some exemplary embodiments, the lift-robot 20 is capable of accessing containers in the two sections 11s on both opposing sides of a vertical aisle 11v. It should be noted that vertical aisle 11v has a predefined width, which enables lift-robots to move while engaging the vertical faces of the shelving-units on both sides of the vertical aisle 11v.

In some exemplary embodiments, floor-robot 40 is configured to obtain containers from and deliver containers to lift-robots 20 in the designated loading zone 44. Floor-robots 40 are capable of traveling beneath shelves 11 in order to deliver containers to their destinations, e.g. packaging terminal 60, as well as to reach rendezvous places with other lift-robot of another shelve unit 11.

One of the processes conducted in an automated distribution storehouse is assembling orders that may comprise of a plurality of different items. In some exemplary embodiments, a lift-robot takes an inventory container having one item of the order, from its shelf, rendezvous with a floor-robot, and delivers the inventory container to the floor-robot that takes it to a packaging terminal. At the packaging terminal, such as terminal 60 of FIG. 1, items are collected manually from the inventory container and placed in a container dedicated to collecting the order, also referred to as an order container. Afterward, the floor-robot 40 is dispatched to return the inventory container to its shelf. The process described above may be repeated for each one of the item types in the order being assembled. However, it should be noted that several lift-robots of different shelving-units and several floor-robots can be involved simultaneously for assembling the order. Indeed, it will speed up the process but will not improve efficiency because the overall number of floor-robots trips remains the same.

Vending-totes 90 may be designed to be coupled with either a lift-robot or a floor-robot to autonomously dispense a measured number of items to another tote, such as tote 30, without departing from its shelving-unit. Additionally, or alternatively, vending-tote 100 may be configured to dispense the measured number of items while being suspended above the other tote. Additionally, or alternatively, vending-tote 100 may be configured to dispense the measured number of items without being transported to terminal 60.

In some exemplary embodiments, tote 30 may be an inventory tote. Inventory tote may be used for storing, on the shelves of shelving-unit 11, one type of inventory item, or different inventory items that have an affinity to one another. In some exemplary embodiments, a vending-tote 100 may be utilized to dispense items of different type to tote 30. Such mixed-content tote may be then transported to terminal 60 to be utilized to assemble an order tote. Additionally, or alternatively, tote 30 may be an order tote, in which the order, or portion thereof is assembled. In some exemplary embodiments, tote 30 may be used as a container in which vending-totes dispense items to it while it is being carried by the floor-robot 40. In some exemplary embodiments, tote 30 can travel on top of floor-robot 40 between different shelves 11 for collecting different items from different vending-totes in order to assemble an order and deliver it to terminal 60 for assembling an order tote or to customer.

In some exemplary embodiments, tote 30 comprises partitions that form compartments to enable separating different items from one another.

Figure 3:
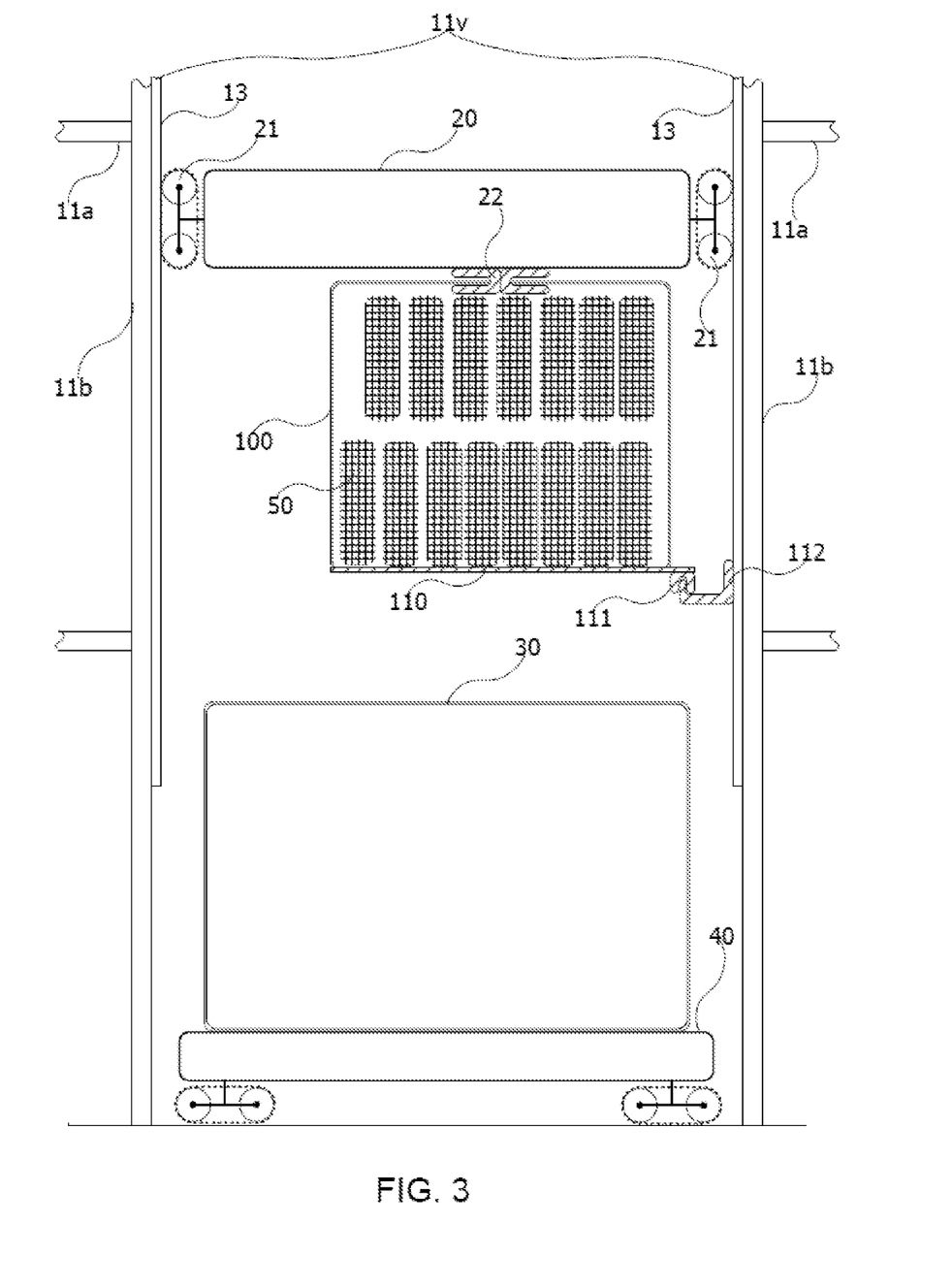
FIG. 3 illustrates a front view of a vending-tote in a dispensing position, in accordance with some exemplary embodiments of the disclosed subject matter.

Referring now to FIG. 3 illustrating a front view of a vending-tote in a dispensing position, in accordance with some exemplary embodiments of the disclosed subject matter. Vending-tote 100 may be a vending-tote, such as vending-tote 90 of FIG. 1. Vending-tote 100 may be a container designed for retaining a plurality of items 50. Vending-tote 100 may have a dispensing capability enabling selective dispensing of the items.

The vending-tote 100, of FIG. 3, is depicted in a dispensing position after it was pulled-out, by lift-robot 20, from a shelf and moved across the shelving-unit to vertical aisle 11v to rendezvous with floor-robot 40. Vending-tote 100 is illustrated in a dispensing position, located directly above tote 30, which is carried by floor-robot 40. In some exemplary embodiments, vending-tote 100 may comprise a hatch 110 having a tab 111 fitted at one end of the hatch 110. Tab 111 may be utilized in a procedure of dispensing a measured number of items to tote 30.

In some exemplary embodiments, the lift-robot 20 may utilize pullers 22 for grabbing the vending-tote 100 as well as moving it sideways along a horizontal axis of the vertical aisle 11v. The lift-robot 20 is also capable of moving up and down along rails 13 by means of crawlers 21, thereby lifting the vending-tote 100 to shelves 11b level or down toward tote 30. However, it is noted that other mechanisms may be utilized for moving lift-robot 20, for carrying totes by lift-robot 20, or the like.

In some exemplary embodiments, the procedure of dispensing a measured number of items starts by lowering vending-tote 100, with lift-robot 20, to a height level where member 112 captures tab 111 of the vending-tote 100. Member 112 may be a rigid bracket connected to one rail 13 at a level that defines the lowest possible height that vending-tote 100 can be lowered. Additionally, or alternatively, member 112 may be coupled to another element, and may be separated from any rail or shelving unit. As an example, member 112 may be affixed to a side wall. It will be appreciated that the height level may define the height in which items can be dropped to tote 30 placed on a floor-robot 40. In some exemplary embodiments, the height level may be an optimal height for dropping of items (e.g., below a height that may cause damage to the dropped item, or to items dropped thereon). In some exemplary embodiments, there may be different members at different height levels enabling the computer system orchestrating the order assembly to select different heights for different scenarios that involve vending items.

In some exemplary embodiments, the lift-robot 20 moves the vending-tote 100 sideways towards opposing rail 13 that is opposite to rail 13 to which member 112 is coupled and thereby exerts a side force on the tab resulting in opening the hatch 110 by a sliding motion. In some exemplary embodiments, hatch 110 may remain opened for a duration that enables the dispensing of a required amount of items. Additionally, or alternatively, a size of the opening may be controlled by the lift-robot 20. Different sizes of openings may provide a different amount of dispensed items, thereby allowing the system to control the amount of items being dispensed. In some exemplary embodiments, after the dispensing is completed, the lift-robot 20 moves back, toward rail 13 to which the member 112 is coupled, for closing hatch 110. In some exemplary embodiments, the dispensing procedure may be followed by returning the vending-tote 100 to its place on the shelf, to a different place, or to perform another dispensing operation.

In some exemplary embodiments, tab 111 and member 112 may be positioned in a perpendicular manner to that illustrated, so as to allow movement of lift-robot 20 in the axis of the vertical aisle 11v instead of a sideway motion, as illustrated therein. Other configurations may be implemented that relay on a different sideway motion or exertion of force.

Figure 4:
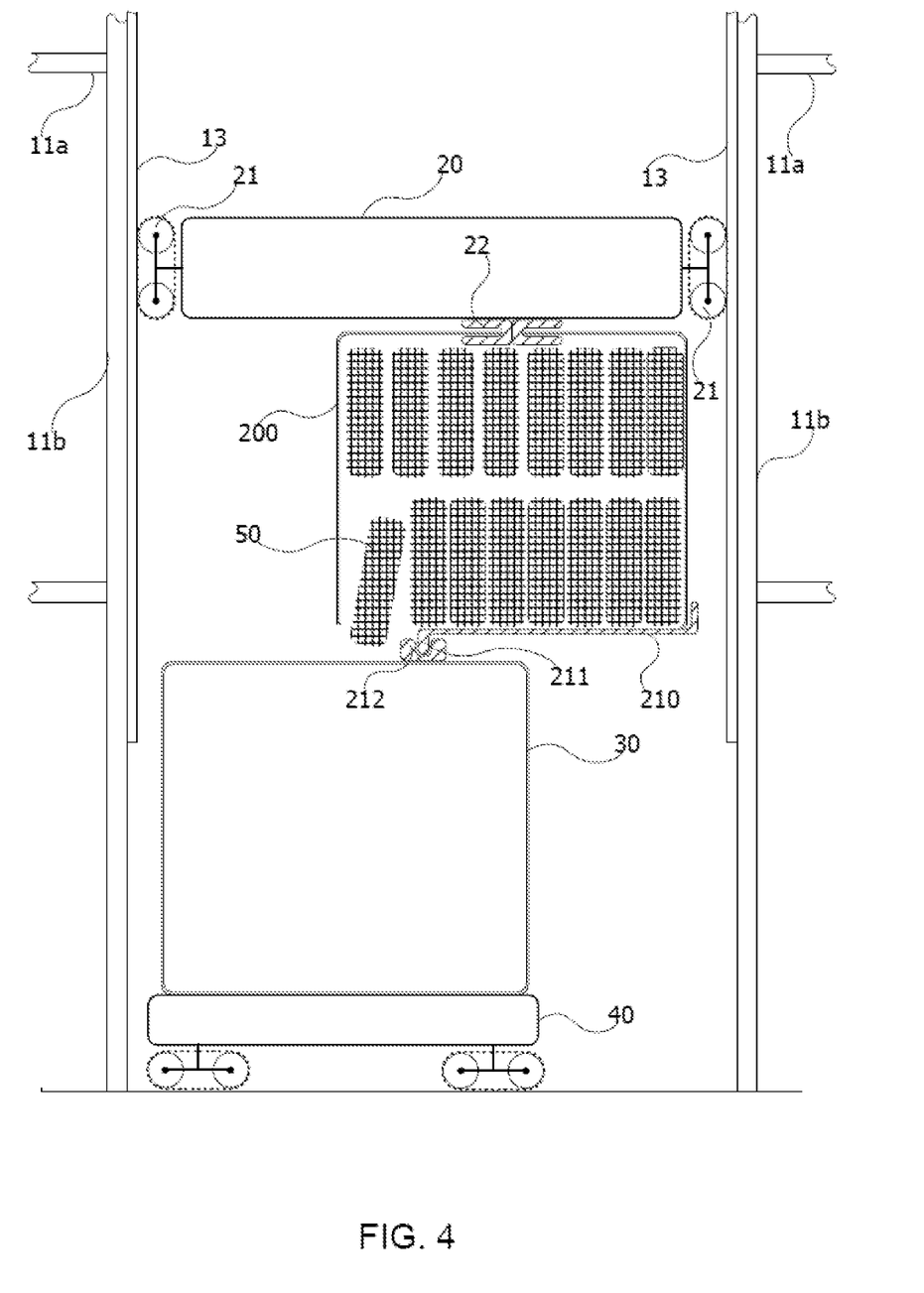
FIG. 4 illustrates a front view of a vending-tote in a dispensing position, in accordance with some exemplary embodiments of the disclosed subject matter.

Referring now to FIG. 4 illustrating a front view of another vending-tote in a dispensing position, in accordance with some exemplary embodiments of the disclosed subject matter. Vending-tote 200 may be a vending-tote, such as vending-tote 90 of FIG. 1. Vending-tote 200 is a container designed for retaining a plurality of items 50. Vending-tote 200 may have a dispensing capability enabling selective dispensing of the items.

The vending-tote 200, of FIG. 4, is depicted in a dispensing position after it was pulled-out, by lift-robot 20, from a shelf and moved across the shelving-unit to vertical aisle 11v above tote 30, which is carried by floor-robot 40. In some exemplary embodiments, vending-tote 200 may comprise a hatch 210 having a protrusion 211. In some exemplary embodiments, the protrusion 211 may be fitted at one end of the hatch 210. The protrusion may be utilized in a procedure of dispensing a measured number of items to tote 30.

In some exemplary embodiments, the lift-robot 20 may utilize pullers 22 for grabbing the vending-tote 200 as well as moving it sideways along a horizontal axis of the vertical aisle 11v. The lift-robot 20 is also capable of moving up and down along rails 13 by means of crawlers 21, and thereby lifting the vending-tote 200 to shelves 11b level or down toward tote 30. However, it is noted that other mechanisms may be utilized for moving lift-robot 20, for carrying totes by lift-robot 20, or the like.

In some exemplary embodiments, tote 30 comprises a socket 211 fitted on top of tote 30 and adapted to be utilized in the procedure of dispensing a measured number of items to the tote 30.

In some exemplary embodiments, the procedure of dispensing a measured number of items starts by lowering vending-tote 200, by lift-robot 20, to a level where socket 212 captures protrusion 211 of the vending-tote 200. Socket 212 may be a rigid bracket or a member connected on top of tote 30. In some exemplary embodiments, socket 212 may be located at a height that is accessible to vending-tote 200, when lowered by lift-robot 20. In some exemplary embodiments, socket 212 may be positioned at a level that defines the lowest possible height to which vending-tote 200 can be lowered. In some exemplary embodiments, such level may define an optimal height in which items can be dropped to a tote 30 placed on a floor-robot 40.

In some exemplary embodiments, the hatch 210 of vending-tote 200 can be opened by moving the vending-tote 200 (with lift-robot 20) sideways, away from tote 30; moving the tote 30 (with floor-robot 40) sideways, away from vending-tote 200; and a combination thereof. It will be appreciated that by moving either one of the totes sideways a side force is exerted on protrusion 211, thereby opening or closing hatch 210. After hatch 110 was opened for a duration that enabled dispensing a required number of items, creating an opening of a desired size enabling the dispensing of the required number of items, combination thereof or the like, hatch 210 of vending-tote 200 can be closed by moving the tote 30 or the vending-tote 200 or both sideways toward each other. This dispensing procedure may be followed by returning the tote 200 to its place on the shelf, to a new place, or to a different dispensing position for another dispensing operation.

In some exemplary embodiments, protrusion 211 and socket 212 may be positioned in a perpendicular manner to that illustrated, so as to allow movement of lift-robot 20 or of floor-robot 40 in the axis of the vertical aisle 11v instead of a sideway motion, as illustrated in FIG. 4. Other configurations may be implemented that relay on a different sideway motion or exertion of force.

Figure 5:
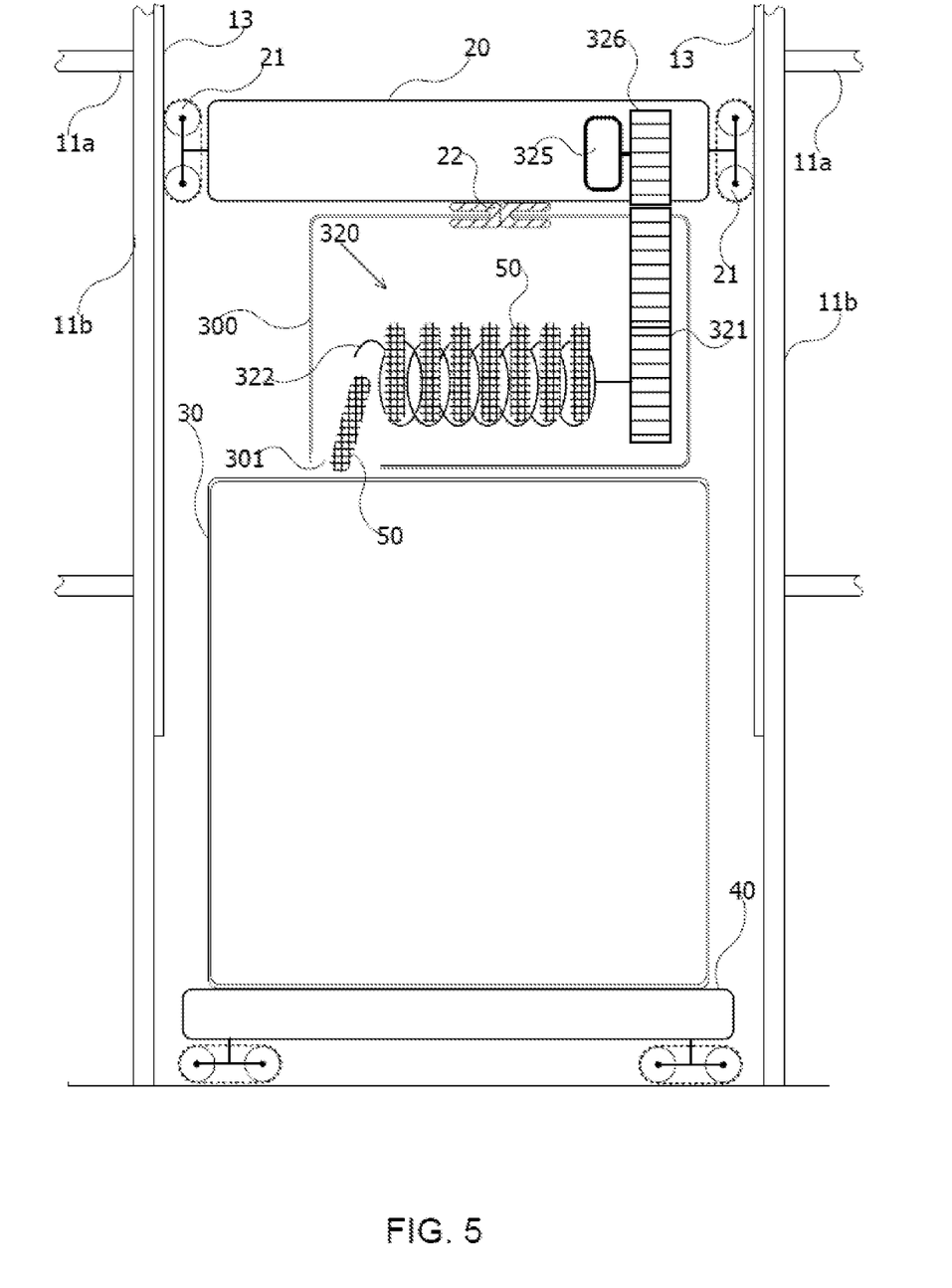
FIG. 5 illustrates a front view of a vending-tote in a dispensing position, in accordance with some exemplary embodiments of the disclosed subject matter.

Referring now to FIG. 5 illustrating a front view of yet another vending-tote in a dispensing position, in accordance with some exemplary embodiments of the disclosed subject matter. Vending-tote 300, such as vending-tote 90 of FIG. 1, may be a container designed for retaining a plurality of items 50. Vending-tote may be configured to provide a selective dispensing capability of the items.

The vending-tote 300 of FIG. 5 is depicted in a dispensing position after it was pulled-out, by lift-robot 20, from a shelf and moved across the shelving-unit to vertical aisle 11v above tote 30. In some exemplary embodiments, vending-tote 300 may comprise an opening 301 and at least one spiral dispensing mechanisms 320 that can be utilized in a procedure of dispensing a measured number of items to tote 30.

It will be appreciated that the lift-robot 20 may utilize pullers 22 for grabbing the vending-tote 100 as well as moving it sideways along a horizontal axis of the vertical aisle 11v. The lift-robot 20 is also capable of moving up and down along rails 13 by means of crawlers 21, and thereby lifting the vending-tote 100 to shelves 11b level or down toward tote 30. However, it is noted that other mechanisms may be utilized for moving lift-robot 20, for carrying totes by lift-robot 20, or the like.

In some exemplary embodiments, lift-robot 20 further comprises an actuating-unit comprised of an actuator 325, such as an electrical motor, and a transmission 326, such as gears, a belt mechanism, a combination thereof, or the like that are configured to interface with spiral dispensing mechanism 320 of vending-tote 300.

In some exemplary embodiments, the spiral dispensing mechanism 320 comprises a coil 322 connected to a second-transmission 321, designed to interface with transmission 326 of lift-robot 20. In some exemplary embodiments, either second-transmission 321 protrudes upwardly, transmission 326 protrudes downwardly or both to enable interfacing of the transmissions so that coil 322 can be rotated upon activating the actuator 325 by the lift-robot 20.

In some exemplary embodiments, the procedure of dispensing a measured number of items starts by lowering vending-tote 300, by lift-robot 20, to a level where transmission 321 and 326 are interfaced, e.g. engaged. In some exemplary embodiments, loops making up the coil 322 comprise spaced neighboring loops which are capable of holding items 50. A last loop of the coil is designed for dispensing one item 50 to a tote 30 through the opening 301 when the coil 322 is rotated following actuator 325 activation by lift robot 20. Thus, the dispensing of a measured number of items to tote 30 is proportional to the number of rotations of the lift-robot 20 driven actuator 325. In some exemplary embodiments, opening 301 may be opened and closed by a hatch (not shown), so as to allow dispensing therethrough when the dispensing mechanism is activated, while remaining closed when the dispensing mechanism is not activated.

Figure 6:
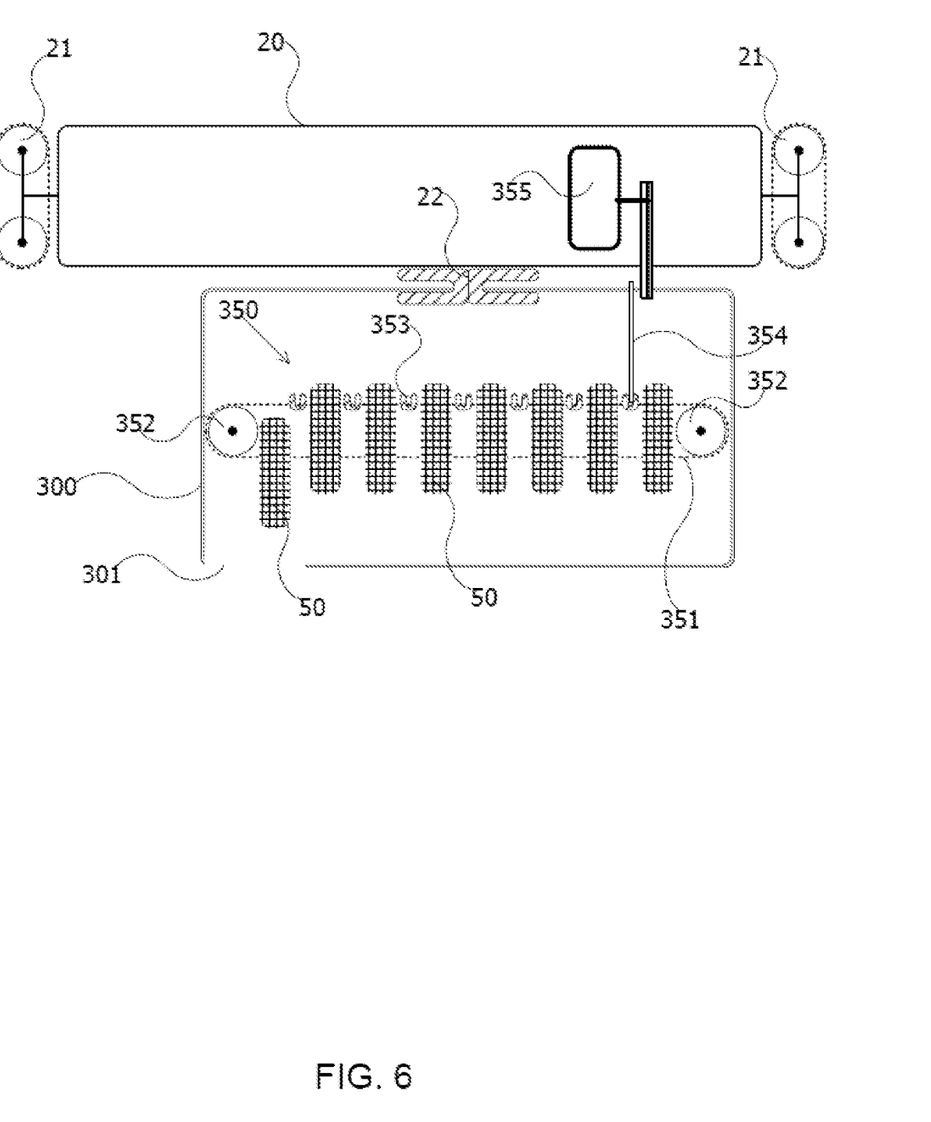
FIG. 6 illustrates a front view of an alternative dispensing mechanism of the vending-tote, of FIG. 5, in a dispensing position, in accordance with some exemplary embodiments of the disclosed subject matter.

Referring now to FIG. 6 illustrating a front view of an alternative dispensing mechanism of the vending-tote 300, in a dispensing position, in accordance with some exemplary embodiments of the disclosed subject matter.

The vending-tote 300 is depicted in a dispensing position after it was pulled-out, by lift-robot 20, from a shelf and moved across the shelving-unit to vertical aisle 11v above tote 30. In some exemplary embodiments, vending-tote 300 comprising an opening 301 and at least one chain dispensing mechanisms 350 utilized for dispensing a measured number of items to tote 30.

In some exemplary embodiments, the lift-robot 20 further comprises an actuating-unit 355, such as for example a linear translation actuator, configured to push/pull a member 354 of the chain dispensing mechanism 350.

In some exemplary embodiments, the chain dispensing mechanism 350 comprises a loop chain 351 configured to rotate around sprockets 352, along the vending-tote 300. In some exemplary embodiments, chain 351 comprises a plurality of dividers 353 utilized for separating between items 50 and engaging with member 354.

In some exemplary embodiments, a procedure of dispensing a measured number of items starts by lowering vending-tote 300, with lift-robot 20, to a level where member 354 interfaces with actuating-unit 355. It will be noted that member 354 protrudes upwardly or actuating-unit 355 protrudes downwardly or both to enable interfacing the actuator 325 with member 354. Following the interfacing, the lift-robot 20 may activate the actuating-unit 355 causing it to push or pull the chain 352 by means of the divider 353 to which member 354 was engaged.

Consequently, one item 50 is dispensed to a tote 30 through opening 301, and member 354 flips to the next divider. Thus, the dispensing of a measured number of items to tote 30 is related to the number of times that chain 351 was pushed or pulled by actuating-unit 355.

In some exemplary embodiments, the vending-totes 100, 200, and 300, of FIGS. 3-5, may be carried by floor-robot 40 for collecting dispensable items, i.e. replacing tote 30 of the embodiments depicted in FIGS. 3-5. Furthermore, the vending-totes or any other tote, such as tote 30, may be pulled out of the shelf, placed on the floor-robot 40, and being dispatched: to collect additional items from other lift-robot; terminal 60; a combination thereof, or the like.

Figure 7:
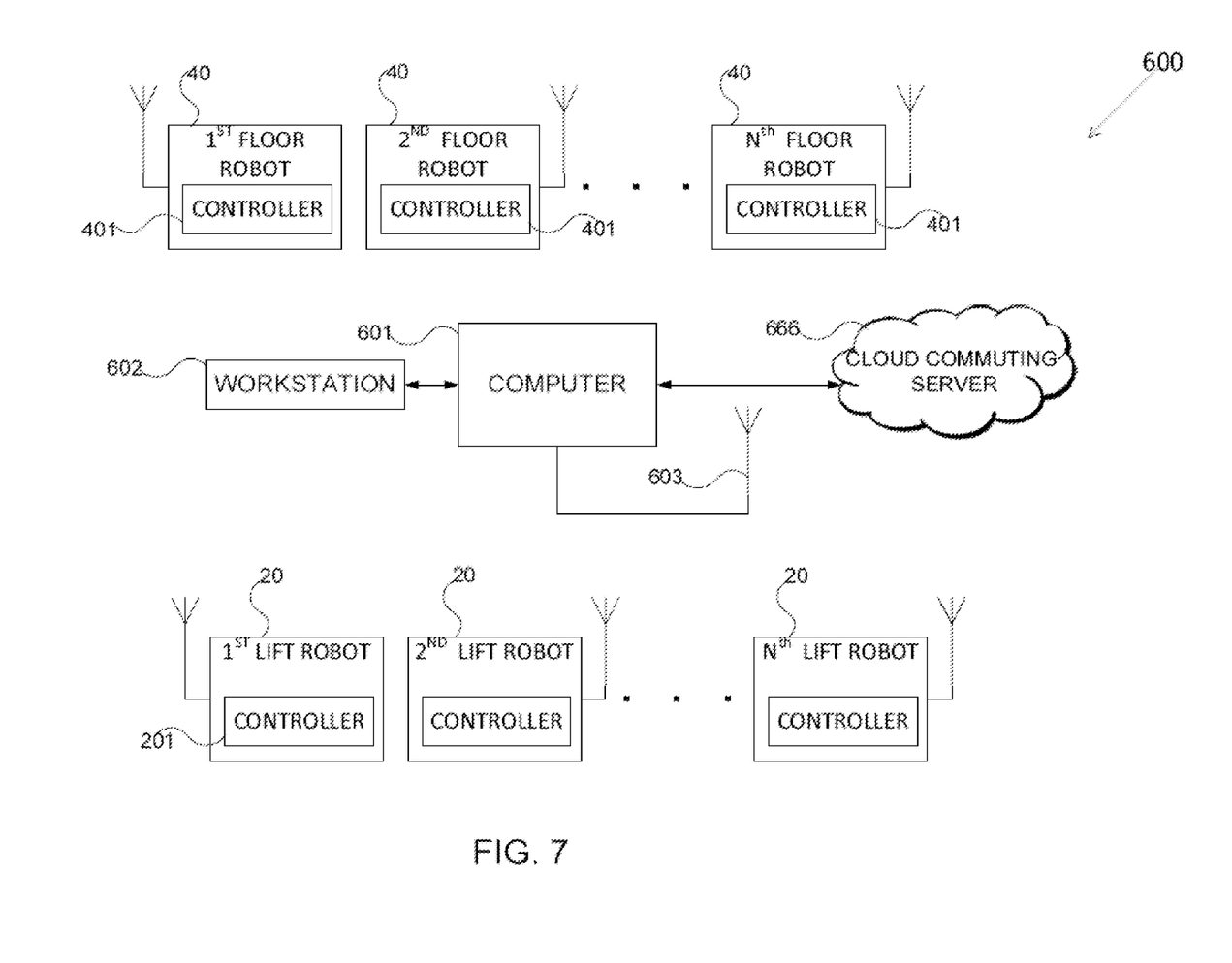
FIG. 7 shows a block diagram of a mission planning control system, in accordance with some exemplary embodiments of the disclosed subject matter.

Referring now to FIG. 7 showing a block diagram of a mission planning control system, in accordance with some exemplary embodiments of the disclosed subject matter. Mission planning control system 600 may be a computerized system adapted to perform missions and control executions associated to automated distribution storehouse, such as the storehouse 10, of FIG. 1, and perform methods such as depicted in FIG. 7.

In some exemplary embodiments, system 600 may comprise at least one computer 601, at least one workstation 602, at least one antenna 603, and a connection to the Internet. Computer 601 may be a central computer; an agent in a distributed computing system; a server that utilizes a cloud computing server (CCS) 666; and any combination thereof, or the like.

In some exemplary embodiments, computer 601 may comprise input/output (I/O) interface (not shown) used for transmitting and receiving information and instructions between the computer 601 and devices, such as a workstation 602; a plurality of lift-robots 20; a plurality of floor-robots 40; and a plurality of vending-totes. Additionally or alternatively, the I/O interface may be used for communicating with the Internet to enable computer 601 to utilize Cloud Computing Server (CCS) 666.

In some exemplary embodiments, the workstation may be used for providing a user of system 600 visualized statuses, reports, or the like. Additionally, or alternatively, the user may use workstation 602 to input orders to be assembled, shipment information, or the like. In some exemplary embodiments, the I/O modules of computer 601 may comprise radio transceivers, such as Wi-Fi transceivers; Bluetooth® transceivers; a combination thereof, or the like. The transceivers may be used by the computer 601 for communicating with the plurality of lift-robots 20; a plurality of floor-robots 40; and a plurality of vending-totes by means of one or more antennas 603. Additionally, or alternatively, wired communication or other types of wireless communications may be utilizing.

In some exemplary embodiments, computer 601 may comprise an internal memory unit (not shown). The memory unit may comprise persistent memory components, such as flash memory or any type of read-only-memory; and volatile memory components, such as random-access memory (RAM). Additionally or alternatively, the memory unit may comprise external memory devices such as for example, a flash disk, an optical storage device, a CD, a DVD, a hard disk, a cloud-storage, such as Google-drive, and any combination thereof, or the like. In some exemplary embodiments, the memory unit may retain program code to activate computer 602 to perform acts associated with any of the steps shown in FIG. 7. Furthermore, the memory unit may retain dedicated software comprising executable files, libraries, and service files intended for mission-planning and controlling the plurality of lift-robots 40 and the plurality floor-robots 40. Additionally or alternatively, the memory unit may also retain a plurality of orders to be assembled.

System 600 may be utilized to perform computations required for planning and controlling missions of the robots in addition to managing the inventory and shipments of the automated distribution storehouse. A mission can be associated with assembling one or more orders. In some exemplary embodiments, the computer 601 generates a plurality of sequentially ordered tasks for each mission; associate certain lift-robots 20 and certain floor-robots 40 to be used in the mission; and transmits the tasks to those robots. The controlling of the missions, by computer 601, involves monitoring and policing activities of each robot of the automated distribution storehouse.

It will be appreciated that in some embodiments the lift-robot and the floor-robot can perform only one task at a time. However, a lift-robot or a floor-robot may perform its task at the same time that other lift-robots 20 or floor-robots are performing theirs. Moreover, a lift-robot and a floor-robot associated with the same mission can perform their tasks at the same time as long as they aren't rendezvousing with one another.

For example, a lift-robot 20, associated with a mission, can perform one task of retrieving a tote from a shelf and bringing it to a vertical-aisle. At the same time a floor-robot 40, associated with the same mission, can travel to rendezvous with the lift-robot 20. Yet, the lift-robot can't proceed with its following task, e.g. dispensing items, before the floor-robot rendezvous with it. Similarly, the floor-robot 40 can't proceed to its following task before the lift-robot completes its task.

In some exemplary embodiments, each lift-robot 20 may comprise a controller 201 and each floor-robot 40 may comprise a controller 401.

In some exemplary embodiments, both controller 201 and controller 401 may be based on a central processing unit (CPU), a microprocessor, an electronic circuit, such as a field-programmable gate array (FPGA) or application-specific integrated circuit (ASIC). Controller 201 and controller 401 may each be utilized to execute tasks, assigned by computer 601, to be carried out by lift-robot 20 and floor-robot 40 respectively.

In some exemplary embodiments, controllers 201 and 401 can each comprise a semiconductor memory component (not shown). The memory can be comprised of persistent and/or volatile memory, such as for example, a flash memory, a random-access memory (RAM), a programmable read only memory (PROM), a re-programmable memory (FLASH), and any combination thereof, or the like. In some exemplary embodiments, each controller utilizes its memory to retain program code, lists of tasks, and logs required for activating the robot it's connected to.

In some exemplary embodiments, controllers 201 and 401 can each comprise radio transceivers, such as Wi-Fi transceivers; Bluetooth® transceivers; a combination thereof, or the like. The transceivers may be used by each controller for communicating with computer 601 and other controller. For example, controller 201 of a lift-robot 20 and controller 401 of a floor-robot 40 that are associated with the same mission may communicate with one another when the floor-robot 40 arrives at their mutual rendezvous place. The communication may further involve exchanging information, such as handshake communication for tracking tasks queuing and their execution, malfunctions, items left in the vending-tote, and any combination thereof, or the like.

In some exemplary embodiments, controller 201 is configured to execute tasks assigned to the lift-robot 20 it is connected to. The tasks may involve typical lift-robot activities, such as extracting, pulling, moving, and replacing any one of the totes, of FIGS. 3-6, about a shelf that the lift-robot 20 is associated with.

Additionally or alternatively, controller 201 may be also configured to execute tasks that cause the lift-robot 20 to activate a vending-tote to dispense a required amount of items to a tote carried by the floor-robot 40, such as depicted in FIGS. 3-6.

In some exemplary embodiments, controller 401 is configured to execute tasks assigned to the floor-robot 40 it is connected to. The tasks may involve typical floor-robot activities, such as traveling between rendezvous locations and terminal 60, of FIG. 1, and obtaining and carrying any one of the totes.

Additionally or alternatively, controller 401 may be also configured to execute tasks that cause the floor-robot 40 to activate a vending-tote to dispense a required amount of items to a tote carried by the floor-robot 40, such as depicted in FIGS. 3-6.

In some exemplary embodiments, both controller 401 and controller 201 may be configured to activate their respective robots to mutually perform the task of dispensing a required amount of items to a tote that the floor-robot 40 carries.

In some exemplary embodiments of the disclosed subject matter, vending-tote 100, 200, and 300, of FIGS. 3-6, may each comprise a vending-tote controller (not shown), such as controllers 201 and 401. In such exemplary embodiments, the controller of the vending-tote may be utilized for executing tasks involving dispensing a required amount of items as well as providing computer 601 with status indications. Additionally or alternatively, the vending-tote controller (not shown) may also comprise sensors configured to determine a remaining amount of items in the vending-tote and transmit information indicating that amount to the computer 601.

Figure 8:
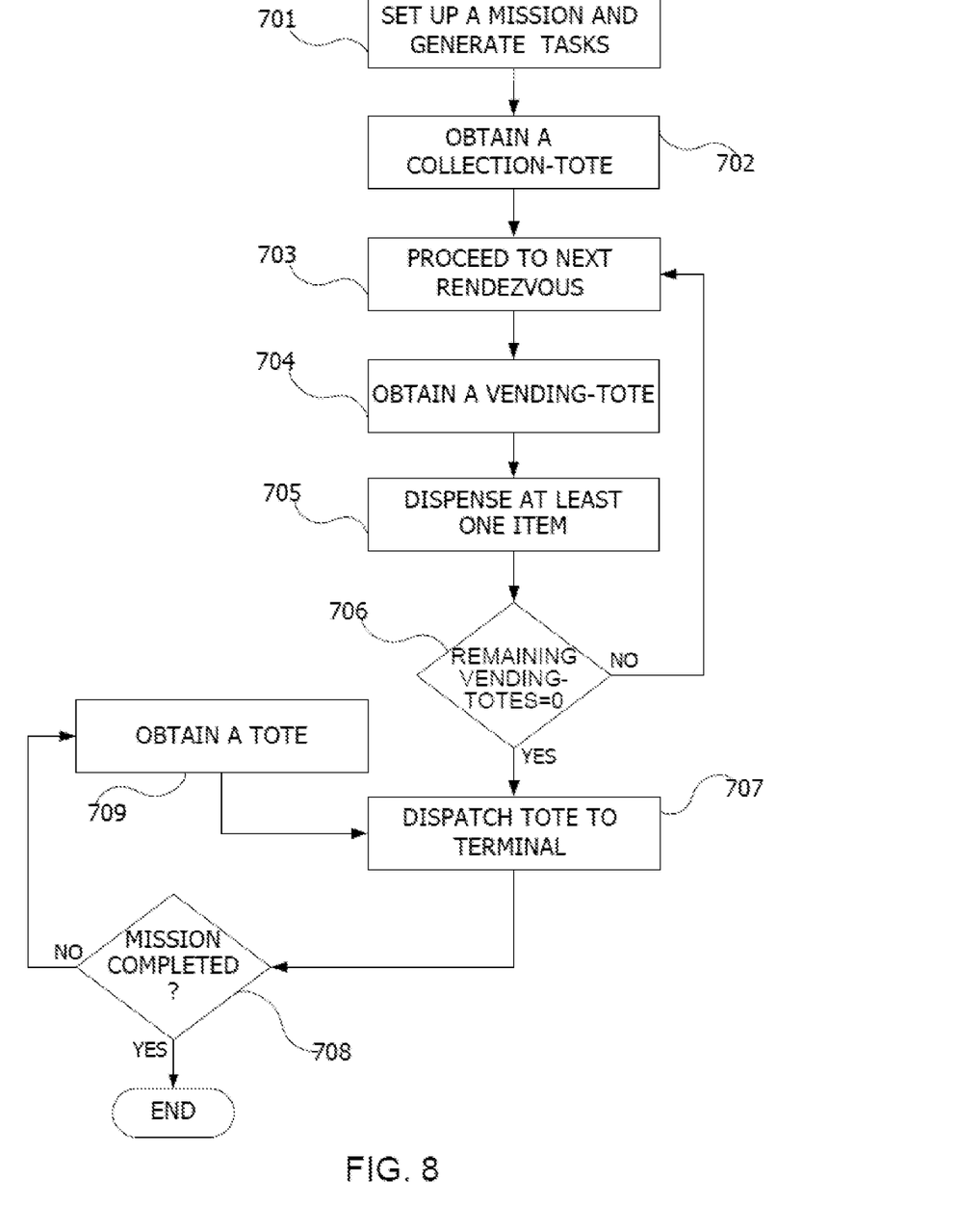
FIG. 8 shows a flowchart diagram of a method of assembling an order in the automated distribution storehouse, in accordance with some exemplary embodiments of the disclosed subject matter.

Referring now to FIG. 8 showing a flowchart diagram of a method of assembling an order in the automated distribution storehouse, in accordance with some exemplary embodiments of the disclosed subject matter.

In step 701, a mission for assembling an order, i.e. a plurality of items, may be set up in response to receiving order entry. In some exemplary embodiments, a mission planning control system, such as system 600, generates a sequence of tasks and respectively assigns them to at least one selected lift-robot, such as lift-robot 20, and to at least one selected floor-robot, such as floor-robot 40.

In conventional implementation a mission can comprise using a lift-robots to transfer inventory totes from shelving units onto floor-robots, and vice versa. The floor-robots may transfer the totes to packaging terminals (e.g., 60 of FIG. 1), where picking is performed from the inventory totes to place items in the order tote. The order tote is then shipped as part of the assembled order. After the inventory tote is utilized in the packaging terminal, it may be returned to a location in the shelving-units (either the same location or a different one), by transferring the tote by a floor-robot and handing the tote over to a lift-robot for placement. This process may be repeated until the order is fully assembled, i.e. mission complete, and the order may be dispatched to the end-client.

In some exemplary embodiments, the mission may comprise using a floor-robot, carrying a tote designated as a collection-tote, for traveling between shelves having vending-totes that contain items of the order. And then collect the items from the vending-tote into the collection-tote, by means of the lift-robot or the floor-robot, followed by bringing the collection-tote to terminal 60, from which the order is shipped.

In another preferred implementation of the present disclosure, the mission may be a combination of the two previously described implementations. In such combination, at least one floor-robot may be involved in collecting items from vending-tote, while one or more other floor-robots are used for bringing one or more inventory totes, having other items of the mission, to the packaging area. Additionally or alternatively, the floor-robot may first obtain a tote containing non-dispensable item, which will be used as a collection-tote, and then proceed to the vending-totes for collecting the rest of the items of the order into that tote.

It will be noted that the tasks and the queue in which they are arranged are derived from: items characteristics; type of totes that the items are stored in shelves; mission efficiency; and any combination thereof, or the like.

Characteristics of the items, such as weight, size, toughness, item's packing, or the like, determines if certain items can be collected into certain totes. For example, large tuna cans can't be dispensed to a tote containing eggs; however, tuna-cans can be added to a tote, used as collection-tote that contains onions.

The characteristics of the items also define if they are dispensable items or not. For example, tuna-cans, loaves of bread or the like are sold per unit and may be considered as dispensable. Some items may require weighing and would not be considered dispensable, such as items sold by weight, where the order indicates a desired weight to be included in the order. As another example, fragile items, such as eggs, may be considered non-dispensable.

In some exemplary embodiments, a mission efficiency in the present disclosure may be determined by the total number of trips per mission that one or more floor-robots makes between shelves 11 and terminal 60, of FIG. 1. Additionally, or alternatively, efficiency may be determined based on the total number of trips of all robots, their accumulated distances, weighted accumulated distances, or the like.

As an example, a mission of assembling an order having 15 items has been set up. Ten items are stored in a vending-tote, i.e. dispensable items, and the rest are stored in a non-vending-tote, such as tote 30. According to one alternative, the mission is set for dispatching one floor-robot to collect the 10 items from the vending-tote and return to terminal 60, of FIG. 1, while one or more additional robots are dispatched for bringing the remaining five non-vending-totes to the terminal. Thus, a total of 6 trips.

According to another alternative, the mission is set to initially dispatch one or more floor-robot to collect the five non-vending-totes. Then to proceed with one or more floor-robot, having non-vending-totes, to be used as collection-tote for collecting the ten dispensable items from the vending-tote. And afterward bringing the collected non-vending-totes to the terminal. Thus, a total of 5 trips.

It is noted that during the mission, different vending-totes may be utilized in sequence, dispensing different items to the same collection-tote. Additionally, or alternatively, different collection-totes can be used for collecting dispensed items from different vending-totes.

In step 702, a tote, such as tote 30, may be obtained to be used as a collection-tote. A floor-robot, such as floor-robot 40, may be tasked with obtaining and carrying the collection-tote. In some exemplary embodiments, the collection-tote may be an empty tote dedicated for collecting items from vending-tote. Additionally or alternatively, the collection-tote may be an inventory tote that comprises a non-dispensable item that is an item of the order. For example, a tote comprising a non-dispensable item in the order, such as onions, can be used as a collection-tote that is tasked with collecting into it items from different vending-totes. The floor-robot may obtain the collection-tote from a lift-robot, such as lift-robot 20, at its first rendezvous place in the mission. Alternatively, the collection-tote may be placed manually on the floor-robot.

In some exemplary embodiments, step 702 may be performed, in parallel by a plurality of floor-robot which will each obtain and carry one collection-tote. Such parallel operation may be required for assembling orders containing a number of dispensable-items that neither fit in one collection-tote nor suitable to the characteristics of the rest of items, or the like. It will be understood that the following steps are conducted for each one of those collection-totes.

In step 703, the floor-robot may proceed with the collection-tote to its next rendezvous place for collecting items from a vending-tote.

In step 704, a vending-tote may be pulled-out by the lift-robot. In some exemplary embodiments, a vending-tote containing an item of the order is pulled-out from its place in a shelf, such as shelf-unit 11 of FIG. 2, and moved to vertical aisle 11v, of FIG. 2, so as to rendezvous with the collection-tote.

In step 705, at least one item may be dispensed. In one exemplary embodiment, the lift-robot activates the vending-tote for dispensing a measured number of items into the collection-tote. In another exemplary embodiment, the floor-robot activates the vending-tote for dispensing a measured number of items into the collection-tote. In yet another exemplary embodiment, the lift-robot and the floor-robot mutually activate the vending-tote for dispensing a measured number of items into the collection-tote.

In step 706, a number of remaining vending-tote in the mission may be determined. Following the determination, steps 703 through 706 may be repeated if not all the vending-tots in the mission dispensed items into the collection-tote.

In step 707, either the collection-tote or a tote that contains non-dispensable items may be dispatched to a packaging terminal, such as terminal 60, whereby items may be picked from any one of the totes or added to one or more collection-totes designated for shipment.

In step 708, a mission completion may be determined. In some exemplary embodiments, a mission is completed after dispatching to the terminal all the totes that contain non-dispensable and all the collection-totes. In case one or more collection-totes didn't complete their tasks, the system 600, of FIG. 6, shall wait for the collection-totes to complete their collection procedure and reach the terminal.

In step 708, one or more floor-robots may be dispatched to rendezvous with lift-robots for obtaining, from the shelves, totes containing missing non-dispensable items, and then send them to the terminal.

It will be appreciated that, one task of a mission of the present disclosure may be comprised of one or more of the steps described above.

It is to be understood that the disclosed subject matter is not limited in its application to the details of construction and the arrangement of the components set forth in the description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, some elements may have been omitted from some of the drawings.

The terms "comprises", "comprising", "includes", "including", and "having" together with their conjugates mean "including but not limited to". The term "consisting of" has the same meaning as "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

Although the disclosed subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosed subject matter.

What is claimed is:

1. A vending-tote adapted to be moved by a lift-robot across vertical paths of a shelving-unit to rendezvous with a second tote carried by a second robot, the vending-tote designed to be coupled to the lift robot, the vending-tote comprising:
   a container containing a plurality of items; and
   a dispensing mechanism integrated with said container, the dispensing mechanism comprising a bulge that protrudes from the container, said dispensing mechanism is configured to be activated at a dispensing position along a vertical path of the shelving-unit,
   wherein, when the vending-tote reaches the dispensing position, the bulge of the dispensing mechanism of the vending-tote is configured to engage a member that is external to the vending-tote, thereby activating the dispensing mechanism, said engaging causing, directly or indirectly, at least one item of the plurality of items to be dispensed into the second tote.

2. The vending-tote of claim 1, wherein the member is attached to a vertical aisle of the vertical path.

3. The vending-tote of claim 1, wherein said dispensing mechanism of said vending-tote comprises a hatch having a tab, the bulge comprising the tab, wherein said tab is adapted to be captured by the member when said vending-tote is at the dispensing position, and wherein subsequently to said capturing, the vending-tote is configured to be moved sideways to an opposite direction of the member, causing the hatch to open.

4. The vending-tote of claim 1 further comprising a hatch hating a protrusion, the bulge comprising the protrusion, wherein the second tote comprises a socket, the member comprising the socket, the socket is adapted to capture the protrusion when said vending-tote is in the dispensing position, thereby allowing the second robot to open the hatch by moving the second tote sideways to an opposite direction of the vending-tote.

5. The vending-tote of claim 1 further comprising a hatch having a protrusion, the bulge comprising the protrusion, wherein the second tote comprises a socket, the member comprising the socket, the socket is adapted to capture the protrusion when said vending-tote is in the dispensing position, thereby allowing the lift robot to open the hatch by moving the vending-tote sideways to an opposite direction n of the socket.

6. The vending-tote of claim 1, wherein the dispensing mechanism of the vending-tote is adapted to interface with an actuating-unit of the lift-robot when the vending-tote is in the dispensing position.

7. The vending-tote of claim 6, wherein the actuating-unit comprises a motor and a transmission, the member comprising the transmission, wherein said dispensing mechanism comprises a second-transmission connected to a coil, the bulge comprising the second-transmission, wherein the transmission and the second-transmission are configured to be interfaced in the dispensing position, and wherein the motor is configured to rotate the coil for activating said dispensing mechanism via said second-transmission in the dispensing position.

8. The vending-tote of claim 6, wherein the actuating-unit comprises a linear translation actuator associated with the member, wherein said dispensing mechanism comprises a dais having a plurality of dividers adapted to engage in turn with the member, and wherein the linear translation actuator is configured to push said chain with said member for dispensing at least one item when the linear translation actuator and said member are interfaced, wherein said member and the linear translation actuator are configured to be interfaced in the dispensing position.

9. The vending-tote of claim 1, wherein said dispensing mechanism is configured to selectively dispense the at least one item without dispensing a remaining portion of the plurality of items, whereby said dispensing mechanism is configured to divide the plurality of items between the second tote and said container.

10. A method of dispensing a measured number of items using a vending-tote, the vending-tote adapted to be moved by a lift-robot across vertical paths of a shelving-unit to rendezvous with a second tote carried by a second robot, the vending-tote designed to be coupled to the lift robot, the vending-tote comprising:
   a container containing a plurality of items; and
   a dispensing mechanism integrated with said container, the dispensing mechanism comprising a bulge that protrudes from the container, wherein said dispensing mechanism is configured to be activated at a dispensing position along a vertical path of the shelving unit,
   the method comprising:
   dispatching the second robot carrying the second tote to rendezvous with said vending-tote;
   moving said vending-tote using the lift-robot to a dispensing position; and
   when the vending-tote reaches the dispensing position, activating the dispensing mechanism of said vending-tote to dispense the measured number of items to the second tote, said activating comprises engaging the bulge of the dispensing mechanism of the vending-tote with a member that is external to the vending-tote, said engaging causing, directly or indirectly, the measured number of items to be dispensed into the second tote.

11. The method of claim 10, wherein the container of the vending-tote comprises items of a first type, wherein the second tote comprised at least one item of a second type before said activating the dispensing mechanism to dispense the measured number of items to the second tote, and wherein the first type is different than the second type, whereby after said activating, the second tote comprising a mixed content of items of different types.

12. A method for assembling an order that is comprised by a plurality of items, the method comprising:
   placing a tote on a floor-robot configured to move between a shelving-unit and a packaging-terminal;
   dispatching the floor-robot carrying the tote to rendezvous with a vending-tote;
   moving the vending-tote by a lift-robot across vertical paths from a given shelving-unit to a dispensing position, the vending-tote designed to be coupled to the lift robot, wherein the dispensing position is located adjacent to the shelving-unit, wherein the lift-robot is configured to move across a vertical path of the shelving-unit;
   activating a dispensing mechanism of the vending-tote to dispense a measured number of one or more items of the order to the tote, the dispensing mechanism comprising a bulge that protrudes from the container, said activating comprises engaging the bulge of the dispensing mechanism of the vending-tote with a member that is external to the vending-tote, said engaging causing, directly or indirectly, the measured number of the one or more items to be dispensed into the tote, wherein said activating is performed automatically without human intervention;
   returning the vending-tote to the given shelving-unit;

dispatching the floor-robot carrying the tote to the packaging terminal;
adding, manually or automatically, items to the tote to assemble the order; and
delivering the order, wherein said delivering the order comprises delivering the tote.

13. The method of claim 12 further comprises:
dispatching the floor-robot to rendezvous with a second vending-tote carrying items of a second type, wherein the vending-tote is carrying items of a first type; and
activating a dispensing mechanism of the second vending-tote to dispense a second measured number of one or more items of the order to the tote, wherein said activating the dispensing mechanism of the second vending-tote is performed automatically without human intervention.

14. The method of claim 12 further comprises:
moving the vending-tote by the lift-robot to a second dispensing position, wherein a second floor-robot carrying a second tote is dispatched to rendezvous with the vending-tote at the second dispensing position, wherein the second tote is participating in an assembly of a second order; and
activating the dispensing mechanism of the vending tote to dispense a second measured number of one or more items to the second tote.

15. A system comprising:
multiple shelving units disposed over a floor, the shelving units comprising a vertical array of shelves on which totes are placed;
one or more lift-robots that are capable of traveling up and down the shelving units along vertical paths of the shelving units; and
a vending-tote comprising a container and a dispensing mechanism, the container containing a plurality of items, the dispensing mechanism is integrated with the container, the dispensing mechanism comprising a bulge that protrudes from the container, the vending-tote designed to be coupled to a lift robot from the one or more lift-robots,
wherein the lift robot from the one or more lift-robots is capable of lifting the vending-tote along the vertical paths of the shelving units,
wherein the lift robot is adapted to lower the vending-tote to a dispensing position, said lowering comprising moving the vending-tote across the shelving units to rendezvous with a second tote carried by a second robot, and
wherein, when the vending-tote reaches the dispensing position, the bulge of the dispensing mechanism of the vending-tote engages a member that is external to the vending-tote, thereby activating the dispensing mechanism, said engaging causing, directly or indirectly, at least one item of the plurality of items to be dispensed into the second tote.

16. The system of claim 15, wherein the vending-tote comprises a hatch with a tab, the bulge comprising the tab, wherein subsequently to said engaging, the lift robot is configured to move the vending-tote sideways to an opposite direction of the member, thereby causing the hatch to open.

17. The system of claim 16, wherein a size of an opening of the hatch is controlled by side force exerted by the lift robot, thereby controlling an amount of items being dispensed.

18. The system of claim 16, wherein, after the measured portion of the plurality of items is dispensed into the second tote, the lift-robot is configured to move the vending-tote sideways towards the member, thereby closing the hatch.

19. The system of claim 16, wherein the member comprises a second tab that is perpendicular to the tab.

20. The system of claim 15, wherein the vending-tote comprises a hatch with a protrusion, the bulge comprising the protrusion, the member comprising a socket, wherein subsequently to said engaging, the lift robot is configured to move the vending-tote sideways to an opposite direction of the socket, thereby causing the hatch to open.

21. The system of claim 15, wherein the vending-tote comprises a hatch with a protrusion, the bulge comprising the protrusion, the member comprising a socket of the second tote, wherein subsequently to said engaging, the second robot is configured to move the second tote sideways to an opposite direction of the vending-tote, thereby causing the hatch to open.

22. The system of claim 15, wherein the dispensing mechanism comprises a spiral coil attached to a first transmission, the bulge comprising the first transmission, the lift robot comprises an actuator that is attached to a second transmission, the member comprising the second transmission, wherein the actuator is configured to interface with the spiral coil via the second transmission during said engaging, thereby rotating the spiral coil, wherein a number of rotations of the actuator results with a proportional number of items being dispensed from the vending-tote.

23. The system of claim 15, wherein the dispensing mechanism comprises a loop chain that is configured to rotate around one or more sprockets, the loop chain comprises a plurality of dividers, at least one of which is attached to a first member, the bulge comprising the first member, the lift robot comprises a linear translation actuator that is attached to a second member, the member comprising the second member, wherein:
the second member of the linear translation actuator is configured to interface with the first member;
in response to said interfacing, the lift robot is configured to activate the linear translation actuator, thereby causing the linear translation actuator to push the loop chain via the first member, causing a single item to be dispensed from the vending-tote, and
wherein a number of times that the loop chain is pushed results with a proportional number of items being dispensed from the vending-tote.

24. The system of claim 15, wherein one or more pullers of the lift robot are configured to grab the vending-tote from above, whereby the vending-tote is lower than the lift robot with respect to the floor.

25. The system of claim 15, wherein the second robot comprises a floor robot that is configured to travel on the floor between the shelving units.

* * * * *